(12) United States Patent
Wang et al.

(10) Patent No.: US 10,577,802 B2
(45) Date of Patent: Mar. 3, 2020

(54) ROOF-GREENING GRASS CARPET, CULTIVATION METHOD THEREOF, AND METHOD FOR ONE-STEP ESTABLISHMENT OF TURF USING THE SAME

(71) Applicant: Dongguan Vanke Building Technique Research Co., Ltd., Dongguan, Guangdong (CN)

(72) Inventors: Yun Wang, Dongguan (CN); Yu Shi, Dongguan (CN); Changhan Li, Dongguan (CN); Xingzhao Liu, Dongguan (CN)

(73) Assignee: Dongguan Vanke Building Technique Research Co., Ltd, Dongguan (CN)

( * ) Notice: Subject to any disclaimer, the term of this patent is extended or adjusted under 35 U.S.C. 154(b) by 137 days.

(21) Appl. No.: 14/735,160

(22) Filed: Jun. 10, 2015

(65) Prior Publication Data
US 2015/0354219 A1    Dec. 10, 2015

(30) Foreign Application Priority Data
Jun. 10, 2014 (CN) .......................... 2014 1 0256481

(51) Int. Cl.
*A01G 20/20*  (2018.01)
*E04D 11/00*  (2006.01)

(52) U.S. Cl.
CPC ............ *E04D 11/002* (2013.01); *A01G 20/20* (2018.02); *Y02A 30/254* (2018.01); *Y02B 80/32* (2013.01)

(58) Field of Classification Search
CPC ... A01G 1/002; A01G 2001/008; A01G 1/005
See application file for complete search history.

(56) References Cited

U.S. PATENT DOCUMENTS

| | | | | |
|---|---|---|---|---|
| 2,826,865 A | * | 3/1958 | Chohamin | A01C 1/044 47/56 |
| 2,923,093 A | * | 2/1960 | Allen | D04H 1/498 47/56 |
| 4,190,981 A | * | 3/1980 | Muldner | A01G 1/005 47/56 |
| 4,318,248 A | * | 3/1982 | Muldner | A01C 1/044 47/56 |
| 4,584,790 A | * | 4/1986 | Gaughen | A01C 1/044 156/276 |
| 5,373,661 A | * | 12/1994 | Furukawa | E01C 13/02 47/65.9 |

(Continued)

*Primary Examiner* — Kristen C Hayes

(57) ABSTRACT

The present application relates to a roof-greening grass carpet, a cultivation method thereof, and a method for one-step establishment of a turf using the same. Wherein the roof-greening grass carpet comprises a first filtering cotton layer, a moisturizing cotton layer, a second filtering cotton layer and a planting layer; the first filtering cotton layer, the moisturizing cotton layer, the second filtering cotton layer and the planting layer are arranged one after the other from the bottom up; a thickness of the first filtering cotton layer ranges from 0.8 mm to 5 mm; a thickness of the moisturizing cotton layer ranges from 3 mm to 10 mm; and a thickness of the second filtering cotton layer ranges from 0.8 mm to 5 mm; roots in the planting layer run through the second filtering cotton layer, and further root into the moisturizing cotton layer.

4 Claims, 1 Drawing Sheet

(56) References Cited

U.S. PATENT DOCUMENTS

| | | | | | |
|---|---|---|---|---|---|
| 5,390,442 | A | * | 2/1995 | Behrens | E04D 11/002 47/59 R |
| 5,836,107 | A | * | 11/1998 | Behrens | E04D 11/002 47/56 |
| 6,135,672 | A | * | 10/2000 | Davidson | E02D 17/20 405/19 |
| 9,032,665 | B2 | * | 5/2015 | Whitney | A01G 31/02 47/59 R |
| 2006/0150500 | A1 | * | 7/2006 | Behrens | E04D 11/002 47/65.9 |
| 2010/0126066 | A1 | * | 5/2010 | DeVos | E04D 11/002 47/65.9 |

* cited by examiner

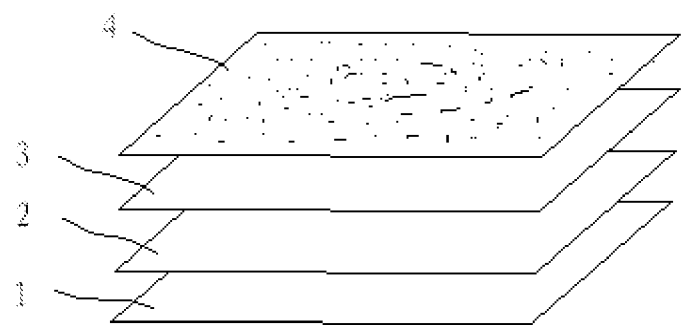

ROOF-GREENING GRASS CARPET, CULTIVATION METHOD THEREOF, AND METHOD FOR ONE-STEP ESTABLISHMENT OF TURF USING THE SAME

CROSS-REFERENCE TO RELATED APPLICATIONS

This present application claims the benefit of Chinese Patent Application No. 201410256481.2 filed on Jun. 10, 2014, the contents of which are hereby incorporated by reference.

TECHNICAL FIELD

The present application relates to a greening and environmental protection technology, and more particularly, relates to a roof-greening grass carpet, a cultivation method thereof and a method for one-step establishment of a turf using the grass carpet.

BACKGROUND

With the accelerating of the industrialization process, the urban population density is increased, and environmental pollutions such as exhaust gas, dust, noise or the like are aggravated increasingly, which badly damage the physical and psychological health of citizens. Therefore, it is imperative to increase the green area of a city. However, the green area on the ground of a city is limited, and thus vertical greening, in particular roof greening should be developed. At present, a grass carpet is generally used for greening a roof. In the prior art, planting methods for roof-greening grass carpets using for establishing a turf in one step all include a growth medium, wherein the growth medium consists of plant waste or household garbage, sawdust, yellow soil, synthetic fertilizer, quicklime, cement, bone meal or the like. And the cultivation method for the roof-greening is described as follow: firstly the growth medium is prepared; then the growth medium are carried to the roof and further evenly placed on the roof. After that, rootless seedlings of sedum lineare are further sowed on the growth medium, and a few of nutrition media are covered onto the seedlings; or the rootless seedlings of the sedum lineare are planted on the growth medium by a cuttage method. After planted, the seedlings should be frequently watered. It is possible to put into use only after at least 30 days. The disadvantages of the above cultivation method lie in that:

(1) Raw material sources of the growth medium are narrow, which is bad for the promotion of the use of the above cultivation method. Besides, the growth medium only made from plant waste is prone to have pests living therein, and to get rotten. Besides, plants such as sedum lineare may be easily infected, or damaged by the pests, in such a way that the growth of the plants may be affected.

(2) The growth medium is loose, such that it is easily washed away by rains and causes soil erosion. For the growth medium is loose before the sedum lineare is survived to establish a turf, most of the growth medium will be washed away and lost as a result when coming across a large rainfall. Besides, washing by the rains or watering for a long time may result in a loss in the growth medium, which will influence the growth of the sedum lineare later. Furthermore, the growth medium washed away may block sewers or lead to a pollution to the ground of the building, and a situation that the seedlings of the sedum lineare being a mess or washed way may occur, in such a way that a cover degree of the turf established is uneven.

(3) The sedum lineare will survive quickly only by being watered frequently at a pre-growing stage of growth. Therefore, not only a watering apparatus should be reinstalled to communicate with a watering plant, but also the administrator should go up and down frequently, which is inconvenient.

(4) Due to the growth characteristics of the sedum lineare and the climate conditions, the sedum lineare grows slowly or stop growing in winter or summer. In this way, it is impossible to ensure that the establishment may be implemented all the year round by the method with the growth medium.

Due to the disadvantages described above, a wide promotion and application of the roof-greening are greatly limited.

BRIEF SUMMARY

The object of the present application is to provide a roof-greening grass carpet, a cultivation method thereof and a method for one-step establishment of a turf using the grass carpet, aiming at the defects in the art described above.

The technical solutions to solve the technical problem are as follows.

In one aspect, a roof-greening grass carpet is provided, which comprises a first filtering cotton layer for protecting a floor slab by preventing moisture from percolating, a moisturizing cotton layer for storing the moisture, a second filtering cotton layer for reducing an evaporation rate of the moisture contained in the moisturizing cotton layer and a planting layer; wherein the first filtering cotton layer, the moisturizing cotton layer, the second filtering cotton layer and the planting layer are arranged one after the other from the bottom up; a thickness of the first filtering cotton layer ranges from 0.8 mm to 5 mm; a thickness of the moisturizing cotton layer ranges from 3 mm to 10 mm; and a thickness of the second filtering cotton layer ranges from 0.8 mm to 5 mm; roots in the planting layer run through the second filtering cotton layer, and further root into the moisturizing cotton layer.

Preferably, any kind selected from a group consisting of sedum lineare, callisia repens and zebrina pendula schnizl constitute the planting layer.

In one embodiment, a composite planting carpet is formed by the first filtering cotton layer, the moisturizing cotton layer and the second filtering cotton layer; and the composite planting carpet is in shape of a square, a rectangle, or in any other shape.

In one embodiment, the first filtering cotton layer and/or the second filtering cotton layer are made from filtering cotton, non-woven fabrics, water pulp paper, air permeable sponge or felt; the moisturizing cotton layer is made from water absorption sponge.

In another aspect, a cultivation method of the roof-greening grass carpet is further provided, which comprises the following steps:

a) sewing or binding the first filtering cotton layer, the moisturizing cotton layer and the second filtering cotton layer paved one after the other from the bottom up together to form a composite planting carpet, wherein the composite planting carpet is in shape of a square, a rectangle, or in any other shape;

b) carpeting the composite planting carpet on the ground with a shading ratio of 30%-70%;

c) watering the composite planting carpet until water flows out of the composite planting carpet;

d) evenly cutting the sedum lineare into severed stems with a length of 2-3 cm, and further evenly sowing the severed stems on the composite planting carpet, in such a way that the sedum lineare and the composite planting carpet together form a roof-greening grass carpet;

e) daily watering the roof-greening grass carpet until a height of the sedum lineare reaches to 3-4 cm, thereby forming the planting layer.

In one embodiment, the step d) further includes: on the second day after the sedum lineare has been sowed onto the composite planting carpet, rooting power with a preset concentration is sprayed to the sedum lineare; and the preset concentration of the rooting power is any value selected from 8 mg per kilogram of pesticide to 15 mg per kilogram of pesticide.

In this embodiment, the step d) further includes: on the fifth day after the sedum lineare has been sowed onto the composite planting carpet, gibberellins with a preset concentration are sprayed to the sedum lineare; the preset concentration of the gibberellins is acquired by diluting the 4% gibberellins emulsifiable concentrate 3000-5000 times.

In another embodiment, the step e) further includes: after the sedum lineare has grown 9 leaves, paclobutrazol with a preset concentration is sprayed onto the sedum lineare every two or three days; and a ratio of the paclobutrazol with a preset concentration and water ranges from 1:700 to 1:1000, and the paclobutrazol is sprayed to the sedum lineare at most twice.

In this embodiment, the step e) further includes: ammonium phosphate solution with a preset concentration is sprayed to the sedum lineare, wherein the preset concentration of the ammonium phosphate solution is 1%-2%.

In a further aspect, a method for one-step establishment of a turf using the roof-greening grass carpet is further provided, which comprises the following steps: a) testing the water permeability of a roof to be greened, and taking necessary measures to ensure that the roof is water-proof;

b) carrying the finished roof-greening grass carpet to the roof and directly assembling thereon;

c) watering the finished roof-greening grass carpet in moderation and further putting into use; the grass carpet dispensing with watering and fertilizing later on, and the grass carpet being capable of growing continually.

When using the roof-greening grass carpet, the cultivation method thereof and the method for one-step establishment of a turf using the grass carpet according to the present application, the following advantages effects can be achieved: firstly, the roof-greening grass carpet according to the present application does not include the growth medium containing nutrition. Therefore, it is possible to avoid the damages to the sedum lineare caused by the pests living in the growth medium or the rotten of the growth medium, and the composite planting carpet will not be washed away, and thus the blocking of the sewers and pollutions to the ground of the building may be avoided. Secondly, the roof-greening grass carpet is cultivated on the ground, and it is possible to avoid cultivating the sedum lineare on the roof. Thirdly, the grass carpet with the sedum lineare according to the present application is made from materials possessing pulling force, which is advantageous for the whole grass carpet with the sedum lineare to carry and carpet. Fourthly, the grass carpet with the sedum lineare is cultivated in advance according to the present application. In this way, the grass carpet has a high cover degree; generally the cover degree is more than 90%. The roots of the sedum lineare and the material of the grass carpet are interweaved together, and are difficult to separate from each other. Finally, the grass carpet may be constructed all the year round.

BRIEF DESCRIPTION OF THE DRAWINGS

FIG. 1 illustrates a schematic view of a roof-greening grass carpet according to an embodiment of the present application.

DETAILED DESCRIPTION OF THE PREFERRED EMBODIMENT

To make the object, the technical solution and the technical advantages more clearly, the present application will be further described with reference to the accompanying drawings and embodiments in the following. It should be understood that, the specific embodiment described here is just for explanation, not for limitation.

In a preferred embodiment of the present application, a roof-greening grass carpet is provided, which at least includes a first filtering cotton layer 1 for protecting a floor slab by preventing moisture from percolating, a moisturizing cotton layer 2 for storing the moisture, a second filtering cotton layer for reducing an evaporation rate of the moisture contained in the moisturizing cotton layer 2, and a planting layer 4 successively from the bottom up. In this case, a thickness of the first filtering cotton layer 1 ranges from 0.8 mm to 5 mm; a thickness of the moisturizing cotton layer 2 ranges from 3 mm to 10 mm; and a thickness of the second filtering cotton layer 3 ranges from 0.8 mm to 5 mm. As shown in FIG. 1, roots in the planting layer 4 run through the second filtering cotton layer 3, and further root into the moisturizing cotton layer 2.

In this case, any kind selected from a group consisting of sedum lineare, callisia repens and zebrina pendula schnizl may be planted in the planting layer, wherein the zebrina pendula schnizl is a shade plant. In this embodiment, the sedum lineare is planted in the planting layer, which posses excellent traits including drought tolerance, and a great vitality. The sedum lineare will not die in a rootless state for 30 days on the roof during a high temperature and drought condition in summer, and will still keep an exuberant vitality. Besides, the requirements for the growth medium of the sedum lineare are simple, and thus the sedum lineare may be cultivated on the roof by the means of soilless culture.

Furthermore, a composite planting carpet is formed by the first filtering cotton layer 1, the moisturizing cotton layer 2 and the second filtering cotton layer 3, and the sedum lineare is planted in the composite planting carpet. Specifically, the first filtering cotton layer 1, the moisturizing cotton layer 2 and the second filtering cotton layer 3 are sewed or bound together to form the composite planting carpet. In this case, the composite planting carpet may be in shape of a square, a rectangle, or in any other shape.

Specifically, the roof-greening grass carpet according to the present application does not include the growth medium containing planting nutrition. Therefore, it is possible to avoid damages to the sedum lineare caused by pests living in the growth medium or the rotten of the growth medium, and the composite planting carpet will not be washed away, and thus blocking of the sewers and pollutions to the ground of the building may be avoided.

Specifically, the first filtering cotton layer 1 may be made from filtering cotton, non-woven fabrics, water pulp paper, air permeable sponge or felt, and the thickness thereof ranges from 0.8 mm to 5 mm. The first filtering cotton layer 1 is mainly configured for supporting, draining excessive rains, and protecting a floor slab by preventing the moisturizing cotton layer 2 from percolating moisture. A water-retention rate of the moisturizing cotton layer 2 is more than 300%. The moisturizing cotton layer 2 is specifically made from material such as water absorption sponge or the like, and the thickness thereof ranges from 3 mm to 10 mm. The moisturizing cotton layer 2 is mainly configured for storing moisture, absorbing rains, or irrigating moisture, and stably proving moisture to the greening plants, and has functions of drought resisting and water retaining.

The second filtering cotton layer 3 may be made from filtering cotton, non-woven fabrics, water pulp paper, air permeable sponge and felt, and the thickness thereof ranges from 0.8 mm to 5 mm. The second filtering cotton layer 3 is mainly configured for mulching and retaining water, reducing the evaporation rate of the moisture contained in the moisturizing cotton layer 2, and preventing the moisturizing cotton layer 2 from evaporating too much moisture, and has the functions of drought resisting and water retaining.

In the present embodiment, the first filtering cotton layer 1 and the second filtering cotton layer 3 are made from non-woven fabrics.

A cultivation method for the roof-greening grass carpet is further provided in the present application, which comprises the following steps:

a) The first filtering cotton layer 1, the moisturizing cotton layer 2 and the second filtering cotton layer 3 paved one after the other from the bottom up are sewed or bound together to form a composite planting carpet; wherein the composite planting carpet is in shape of a square, a rectangle, or in any other shape.

b) The composite planting carpet is carpeted on the ground with a shading ratio of 30%-70%.

In the present application, the composite planting carpet is firstly placed on the ground with a shading ratio of 30%-70% for the cultivation of the sedum lineare. Therefore, it is advantageous for the survival of the sedum lineare, and thus the sedum lineare is prevented from dying at the earliest stage of the growth due to the exposure to the sun when the sedum lineare is directly planted on the roof.

Besides, the composite planting carpet is in any shapes, such that the shape of the composite planting carpet may be varied to adapt to the structure the roof of each building.

c) The composite planting carpet is watered, until water flows out of the composite planting carpet. In this way, it can be ensured that there is sufficient moisture in the composite planting carpet to satisfy the growth requirements of the sedum lineare.

d) The sedum lineare is evenly cut into severed stems with a length of 2-3 cm (leaves may be remained on the severed stems). The severed stems are further evenly sowed on the composite planting carpet (at this time, the severed stems are laterally stacked onto the composite planting carpet). The sedum lineare and the composite planting carpet together form a roof-greening grass carpet.

Furthermore, on the second day when the sedum lineare has been sowed onto the composite planting carpet, rooting power with a preset concentration is sprayed to the sedum lineare to facilitate a rooting speed of the sedum lineare. The preset concentration of the rooting power is any value selected from 8 mg per kilogram of pesticide to 15 mg per kilogram of pesticide. Preferably, in the present embodiment, the preset concentration of the rooting power is 10 mg per kilogram of pesticide.

Furthermore, on the fifth day when the sedum lineare has been sowed onto the composite planting carpet, gibberellins with a preset concentration are sprayed to the sedum lineare to facilitate the growth of blanches and leaves of the sedum lineare after adventitious roots have been generated. The preset concentration of the gibberellins is acquired by diluting the 4% gibberellins emulsifiable concentrate 3000-5000 times. Preferably, in the present embodiment, the preset concentration of the gibberellins is acquired by diluting the 4% gibberellins emulsifiable concentrate 4000 times.

e) The roof-greening grass carpet is daily watered to keep the composite planting carpet moist, in such a way that sufficient moisture is retained in the composite planting carpet to satisfy the growth requirements of the sedum lineare.

Furthermore, after the sedum lineare has grown 9 leaves, in addition to the daily watering, paclobutrazol with a preset concentration is further sprayed onto the sedum lineare. Preferably, in the present embodiment, the paclobutrazol is diluted 700-1000 times by adding water, and is further sprayed onto the sedum lineare evenly.

f) When a height of the sedum lineare reaches to 3-4 cm (at this time, the roots of the sedum lineare run through the second filtering cotton layer 3 and further extend to the moisturizing cotton layer 2, and the height of the sedum lineare above the second filtering cotton layer 3 reaches to 3-4 cm), the roof-greening grass carpet is then carried to the roof for greening.

Specifically, when the height of the sedum lineare reaches to 3 cm, and has been paved over the whole grass carpet, ammonium phosphate solution with a preset concentration is sprayed to the sedum lineare. In this case, the preset concentration of the ammonium phosphate solution is 1%-2%, and the grass carpet may be put into use a week after applying fertilize. Preferably, in the present embodiment, the preset concentration of the ammonium phosphate solution is 1%.

A method for one-step establishment of a turf using the roof-greening grass carpet described above is further provided, which comprises the following steps:

a) The water permeability of a roof to be greened is tested, and necessary measures are taken to ensure that the roof is water-proof.

b) The finished roof-greening grass carpet is carried to the roof and directly assembled thereon.

c) The finished roof-greening grass carpet is watered in moderation and further put into use. In this case, the grass carpet dispenses with watering and fertilizing later on, and the grass carpet is capable of growing continually.

In conclusion, the following advantageous effects may be achieved in the present application:

(1) The roof-greening grass carpet according to the present application does not include the growth medium containing nutrition. Therefore, it is possible to avoid the damages to the sedum lineare caused by the pests living in the growth medium or the rotten of the growth medium, and the composite planting carpet will not be washed away, and thus the blocking of the sewers and pollutions to the ground of the building may be avoided.

(2) The roof-greening grass carpet is cultivated on the ground, in such a way that the problems caused by cultivating the sedum lineare on the roof are avoided. If the sedum lineare is cultivated on the roof, it is troublesome to respectively carry the sedum lineare and the growth medium to the roof; besides, not only the growth medium needs to be evenly paved on the roof, but also the sedum lineare needs to be evenly paved on the roof, which is time-consuming and strenuous.

Furthermore, it needs to be ensured that the roots of the sedum lineare at a pre-growing stage of the growth are moist, only in this way that the sedum lineare is survived quickly. Therefore, the sedum lineare needs to be water frequently. However, if the sedum lineare is cultivated on the roof, the administrator needs to go up and down frequently. It is quite inconvenient, in particular for a light roof. Besides, watering equipment should be paved on the roof, and the managing period of watering is longer than one month.

Besides, in the early stage of the sedum lineare, if the growth medium is used, it will be loose. Once coming across a heavy rain or washed by the water, the growth medium (even the sedum lineare) is washed away. In this way, a downspout on the roof may be blocked, and the grass carpet with the sedum lineare is uneven.

(3) The grass carpet with the sedum lineare according to the present application is made from materials possessing pulling force, which is advantageous for the whole grass carpet with the sedum lineare to carry and carpet. The dimension and the weight of the grass carpet may be determined as required. Generally, the grass carpet may be carried by a single person. Therefore, when establishing a turf on the roof, the working efficiency may be increased greatly.

(4) The grass carpet with the sedum lineare is cultivated in advance according to the present application. In this way, the grass carpet has a high cover degree; generally the cover degree is more than 90%. The roots of the sedum lineare and the material of the grass carpet are interweaved together, and are difficult to separate from each other. Therefore, when carpeting the grass carpet on the roof, no professionals are needed for establishment. Besides, it may be finished in one step, and the instantaneous effects are good.

(5) The grass carpet may be constructed all the year round.

Though the present application is explained with reference to the specific embodiments, however, it should be understand that in the inspiration of the present application, one skilled in the art may make many modifications or equivalent replacement, without going beyond the purpose and the scope the claims intend to protect of the present application. Besides, one skilled in the art may make various modifications aiming at specific situation or material, without going beyond the purpose and the scope the claims intend to protect of the present application. Therefore, the present application is not limited to the specific embodiment disclosed here, all these belong to the protection of the present application should be protected.

The invention claimed is:

1. A roof-greening grass carpet, comprising a first filtering layer for protecting a floor slab by preventing moisture from percolating, a moisturizing layer for storing the moisture, a second filtering layer for reducing an evaporation rate of the moisture contained in the moisturizing layer and a planting layer having plants planted therein, without growth medium containing planting nutrition; wherein the first filtering layer, the moisturizing layer, the second filtering layer and the planting layer are stacked on one another successively from the bottom up; a thickness of the first filtering layer ranges from 0.8 mm to 5 mm; a thickness of the moisturizing layer ranges from 3 mm to 10 mm; and a thickness of the second filtering layer ranges from 0.8 mm to 5 mm; roots of the plants in the planting layer run through the second filtering layer, and further root into the moisturizing layer; the first filtering layer and/or the second filtering layer are made from non-woven fabrics, water pulp paper, air permeable sponge or felt; the moisturizing layer is made from water absorption sponge;

wherein a water-retention rate of the moisturizing layer is greater than 300%.

2. The roof-greening grass carpet according to claim 1, wherein the plants in the planting layer are selected from a group consisting of sedum lineare, callisia repens and zebrina pendula schnizl.

3. The roof-greening grass carpet according to claim 1, wherein a composite planting carpet is formed by sewing or binding the first filtering layer, the moisturizing layer and the second filtering layer paved one after the other from the bottom up together; and the composite planting carpet is in shape of a square, or a rectangle.

4. The roof-greening grass carpet according to claim 1, wherein the first filtering layer, the moisturizing layer and the second filtering layer are stacked on one another successively and sewed or bound together to form a composite planting carpet;

the planting layer is stacked on one side of the composite planting carpet at which the second filtering layer is located, thereby forming the roof-greening grass carpet.

* * * * *